US012342204B2

(12) United States Patent
Uziel et al.

(10) Patent No.: US 12,342,204 B2
(45) Date of Patent: Jun. 24, 2025

(54) ADAPTIVE PROCESSING ENVELOPE BASED ON CHANNEL CONDITIONS

(71) Applicant: QUALCOMM Incorporated, San Diego, CA (US)

(72) Inventors: Lior Uziel, Hod Hasharon (IL); Guy Wolf, Rosh Haayin (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/867,484

(22) Filed: Jul. 18, 2022

(65) Prior Publication Data

US 2024/0022939 A1 Jan. 18, 2024

(51) Int. Cl.
*H04W 72/04* (2023.01)
*H04W 24/08* (2009.01)
*H04W 24/10* (2009.01)

(52) U.S. Cl.
CPC ........... *H04W 24/10* (2013.01); *H04W 24/08* (2013.01)

(58) Field of Classification Search
CPC ..... H04W 24/10; H04W 24/08; H04W 24/02; H04L 5/0007; H04L 5/0057; H04L 5/0058; H04L 5/0094; H04L 41/0853; H04L 41/0896; H04L 41/0895; H04L 41/0816; H04L 41/40; H04L 43/20; H04L 43/065; H04L 43/0876; H04L 1/0026
See application file for complete search history.

(56) References Cited

U.S. PATENT DOCUMENTS

| 12,150,213 B2 * | 11/2024 | Xiong | H04L 27/2607 |
| 2015/0244430 A1 * | 8/2015 | Shattil | H04L 41/0816 |
| | | | 370/254 |

(Continued)

FOREIGN PATENT DOCUMENTS

| WO | WO-2018050059 A1 * | 3/2018 | H04L 1/18 |
| WO | WO-2021244742 A1 | 12/2021 | |

OTHER PUBLICATIONS

Huawei Tech (UK) Co et al., "Network Virtualization scenarios", NGP(16)000063R1, European Telecommunications Standards Institute (ETSI), 650, Route Des Lucioles, F-06921 Sophia-Antipolis, France vol. ISG, Next Generation Protocols Jun. 15, 2016, XP014384766, pp. 1-11.

(Continued)

*Primary Examiner* — Mahbubul Bar Chowdhury
(74) *Attorney, Agent, or Firm* — Holland & Hart LLP

(57) ABSTRACT

Methods, systems, and devices for wireless communications are described. Generally, the described techniques provide for dynamically adapting a baseband resource envelope (e.g., baseband resources) allocated to a network entity. A virtual radio access network (VRAN) manager (e.g., a host platform for a VRAN) may perform baseband pooling to allocate a baseband resource envelope to a network entity for signal processing at the network entity. The network entity may perform measurements indicating the channel conditions associated with communicating with one or more user equipment (UEs), and the network entity may report the measurements to the VRAN manager. The VRAN manager may then adapt a baseband resource envelope allocated to the network entity based on the measurements to improve the utilization of processing resources.

22 Claims, 11 Drawing Sheets

(56) References Cited

U.S. PATENT DOCUMENTS

| | | | |
|---|---|---|---|
| 2018/0219700 A1 | 8/2018 | Åström et al. | |
| 2019/0364492 A1* | 11/2019 | Azizi | H04L 67/52 |
| 2020/0383066 A1* | 12/2020 | Gutierrez | H04W 52/346 |
| 2023/0128676 A1* | 4/2023 | Berggren | H04L 27/2613 |
| | | | 370/208 |
| 2023/0217256 A1* | 7/2023 | Garcia-Saavedra | H04L 5/001 |
| | | | 370/329 |
| 2024/0380673 A1* | 11/2024 | Yanggratoke | H04L 41/16 |

OTHER PUBLICATIONS

International Search Report and Written Opinion—PCT/US2023/069682—ISA/EPO—Oct. 30, 2023.

\* cited by examiner

ADAPTIVE PROCESSING ENVELOPE BASED ON CHANNEL CONDITIONS

FIELD OF TECHNOLOGY

The following relates to wireless communications, including adaptive processing envelope based on channel conditions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Some wireless communications systems may support baseband pooling, where processing resources may be allocated in pools to network entities. The processing resources may include hardware or software used to perform signal processing (e.g., memory or internal processing resources). Improved techniques for using baseband pooling to efficiently utilize processing resources may be desirable.

SUMMARY

The described techniques relate to improved methods, systems, devices, and apparatuses that support an adaptive processing envelope based on channel conditions. Generally, the described techniques provide for dynamically adapting a baseband resource envelope (e.g., baseband resources) allocated to a network entity. A virtual radio access network (VRAN) manager (e.g., a host platform for a VRAN) may perform baseband pooling to allocate a baseband resource envelope to a network entity for signal processing at the network entity. The network entity may perform measurements indicating the channel conditions associated with communicating with one or more user equipments (UEs), and the network entity may report the measurements to the VRAN manager. The VRAN manager may then adapt a baseband resource envelope allocated to the network entity based on the measurements to improve the utilization of processing resources.

A method for wireless communication at a first network entity is described. The method may include receiving, from a second network entity, a first indication of a first processing envelope for signal processing at the first network entity, the signal processing associated with communicating with one or more UEs, transmitting, to the second network entity, a report based on channel conditions associated with communicating with the one or more user equipment (UE)s, and receiving, from the second network entity, a second indication of a second processing envelope for signal processing at the first network entity, the second indication of the second processing envelope being in response to transmitting the report.

An apparatus for wireless communication at a first network entity is described. The apparatus may include a processor, memory coupled with the processor, and instructions stored in the memory. The instructions may be executable by the processor to cause the apparatus to receive, from a second network entity, a first indication of a first processing envelope for signal processing at the first network entity, the signal processing associated with communicating with one or more UEs, transmit, to the second network entity, a report based on channel conditions associated with communicating with the one or more UEs, and receive, from the second network entity, a second indication of a second processing envelope for signal processing at the first network entity, the second indication of the second processing envelope being in response to transmitting the report.

Another apparatus for wireless communication at a first network entity is described. The apparatus may include means for receiving, from a second network entity, a first indication of a first processing envelope for signal processing at the first network entity, the signal processing associated with communicating with one or more UEs, means for transmitting, to the second network entity, a report based on channel conditions associated with communicating with the one or more UEs, and means for receiving, from the second network entity, a second indication of a second processing envelope for signal processing at the first network entity, the second indication of the second processing envelope being in response to transmitting the report.

A non-transitory computer-readable medium storing code for wireless communication at a first network entity is described. The code may include instructions executable by a processor to receive, from a second network entity, a first indication of a first processing envelope for signal processing at the first network entity, the signal processing associated with communicating with one or more UEs, transmit, to the second network entity, a report based on channel conditions associated with communicating with the one or more UEs, and receive, from the second network entity, a second indication of a second processing envelope for signal processing at the first network entity, the second indication of the second processing envelope being in response to transmitting the report.

Some examples of the method, apparatuses, and non-transitory computer-readable medium described herein may further include operations, features, means, or instructions for performing one or more measurements indicating the channel conditions associated with communicating with the one or more UEs, where transmitting the report includes and transmitting the one or more measurements indicating the channel conditions in the report.

In some examples of the method, apparatuses, and non-transitory computer-readable medium described herein, the one or more measurements include channel condition measurements associated with each UE of the one or more UEs, the channel condition measurements including measurements of a Doppler spread, a noise coherence bandwidth, or a combination thereof.

In some examples of the method, apparatuses, and non-transitory computer-readable medium described herein, the one or more measurements include inter-UE channel correlation measurements, the inter-UE channel correlation measurements including measurements of a covariance, a channel correlation, or a combination thereof.

In some examples of the method, apparatuses, and non-transitory computer-readable medium described herein, the one or more measurements include lower-bound measurements for receiver parameters, the lower-bound measurements for receiver parameters including measurements of an equalizer frequency, a time decimation, or a combination thereof.

Some examples of the method, apparatuses, and non-transitory computer-readable medium described herein may further include operations, features, means, or instructions for transmitting, to the second network entity, an indication of a level of resource utilization of processing resources at the first network entity, the level of resource utilization being based on the channel conditions associated with communicating with the one or more UEs, and the second processing envelope being further based on transmitting the indication of the level of resource utilization.

In some examples of the method, apparatuses, and non-transitory computer-readable medium described herein, a size of the second processing envelope may be greater than a size of the first processing envelope based on the level of resource utilization of the processing resources failing to satisfy a threshold.

In some examples of the method, apparatuses, and non-transitory computer-readable medium described herein, a size of the second processing envelope may be less than or equal to a size of the first processing envelope based on the level of resource utilization of the processing resources satisfying a threshold.

Some examples of the method, apparatuses, and non-transitory computer-readable medium described herein may further include operations, features, means, or instructions for allocating, to a radio unit, a sub-envelope of the second processing envelope, the sub-envelope being for signal processing at the first network entity for communications at the radio unit, and the sub-envelope being based on channel conditions at the radio unit.

In some examples of the method, apparatuses, and non-transitory computer-readable medium described herein, the first network entity includes a distributed unit or a baseband unit, and the second network entity includes a higher layer, a virtual radio access network manager, or a host platform for a virtual radio access network entity.

A method for wireless communication at a first network entity is described. The method may include transmitting, to a second network entity, a first indication of a first processing envelope for signal processing at the second network entity, the signal processing associated with communicating with one or more UEs, receiving, from the second network entity, a report based on channel conditions associated with communicating with the one or more UEs, and transmitting, to the second network entity, a second indication of a second processing envelope for signal processing at the second network entity, the second indication of the second processing envelope being in response to receiving the report.

An apparatus for wireless communication at a first network entity is described. The apparatus may include a processor, memory coupled with the processor, and instructions stored in the memory. The instructions may be executable by the processor to cause the apparatus to transmit, to a second network entity, a first indication of a first processing envelope for signal processing at the second network entity, the signal processing associated with communicating with one or more UEs, receive, from the second network entity, a report based on channel conditions associated with communicating with the one or more UEs, and transmit, to the second network entity, a second indication of a second processing envelope for signal processing at the second network entity, the second indication of the second processing envelope being in response to receiving the report.

Another apparatus for wireless communication at a first network entity is described. The apparatus may include means for transmitting, to a second network entity, a first indication of a first processing envelope for signal processing at the second network entity, the signal processing associated with communicating with one or more UEs, means for receiving, from the second network entity, a report based on channel conditions associated with communicating with the one or more UEs, and means for transmitting, to the second network entity, a second indication of a second processing envelope for signal processing at the second network entity, the second indication of the second processing envelope being in response to receiving the report.

A non-transitory computer-readable medium storing code for wireless communication at a first network entity is described. The code may include instructions executable by a processor to transmit, to a second network entity, a first indication of a first processing envelope for signal processing at the second network entity, the signal processing associated with communicating with one or more UEs, receive, from the second network entity, a report based on channel conditions associated with communicating with the one or more UEs, and transmit, to the second network entity, a second indication of a second processing envelope for signal processing at the second network entity, the second indication of the second processing envelope being in response to receiving the report.

In some examples of the method, apparatuses, and non-transitory computer-readable medium described herein, receiving the report may include operations, features, means, or instructions for receiving, in the report, one or more measurements indicating the channel conditions associated with communicating with the one or more UEs.

In some examples of the method, apparatuses, and non-transitory computer-readable medium described herein, the one or more measurements include channel condition measurements associated with each UE of the one or more UEs, the channel condition measurements including measurements of a Doppler spread, a noise coherence bandwidth, or a combination thereof.

In some examples of the method, apparatuses, and non-transitory computer-readable medium described herein, the one or more measurements include inter-UE channel correlation measurements, the inter-UE channel correlation measurements including measurements of a covariance, a channel correlation, or a combination thereof.

In some examples of the method, apparatuses, and non-transitory computer-readable medium described herein, the one or more measurements include lower-bound measurements for receiver parameters, the lower-bound measurements for receiver parameters including measurements of an equalizer frequency, a time decimation, or a combination thereof.

Some examples of the method, apparatuses, and non-transitory computer-readable medium described herein may further include operations, features, means, or instructions for receiving, from the second network entity, an indication of a level of resource utilization of processing resources at the second network entity, the level of resource utilization being based on the channel conditions associated with communicating with the one or more UEs, and the second processing envelope being further based on receiving the indication of the level of resource utilization.

In some examples of the method, apparatuses, and non-transitory computer-readable medium described herein, a size of the second processing envelope may be greater than a size of the first processing envelope based on the level of resource utilization of the processing resources failing to satisfy a threshold.

In some examples of the method, apparatuses, and non-transitory computer-readable medium described herein, a size of the second processing envelope may be less than or equal to a size of the first processing envelope based on the level of resource utilization of the processing resources satisfying a threshold.

Some examples of the method, apparatuses, and non-transitory computer-readable medium described herein may further include operations, features, means, or instructions for allocating, to a radio unit, a sub-envelope of the second processing envelope, the sub-envelope being for signal processing at the second network entity for communications at the radio unit, and the sub-envelope being based on channel conditions at the radio unit.

In some examples of the method, apparatuses, and non-transitory computer-readable medium described herein, the first network entity includes a higher layer, a virtual radio access network manager, or a host platform for a virtual radio access network entity, and the second network entity includes a distributed unit or a baseband unit.

DETAILED DESCRIPTION

Figure 1:
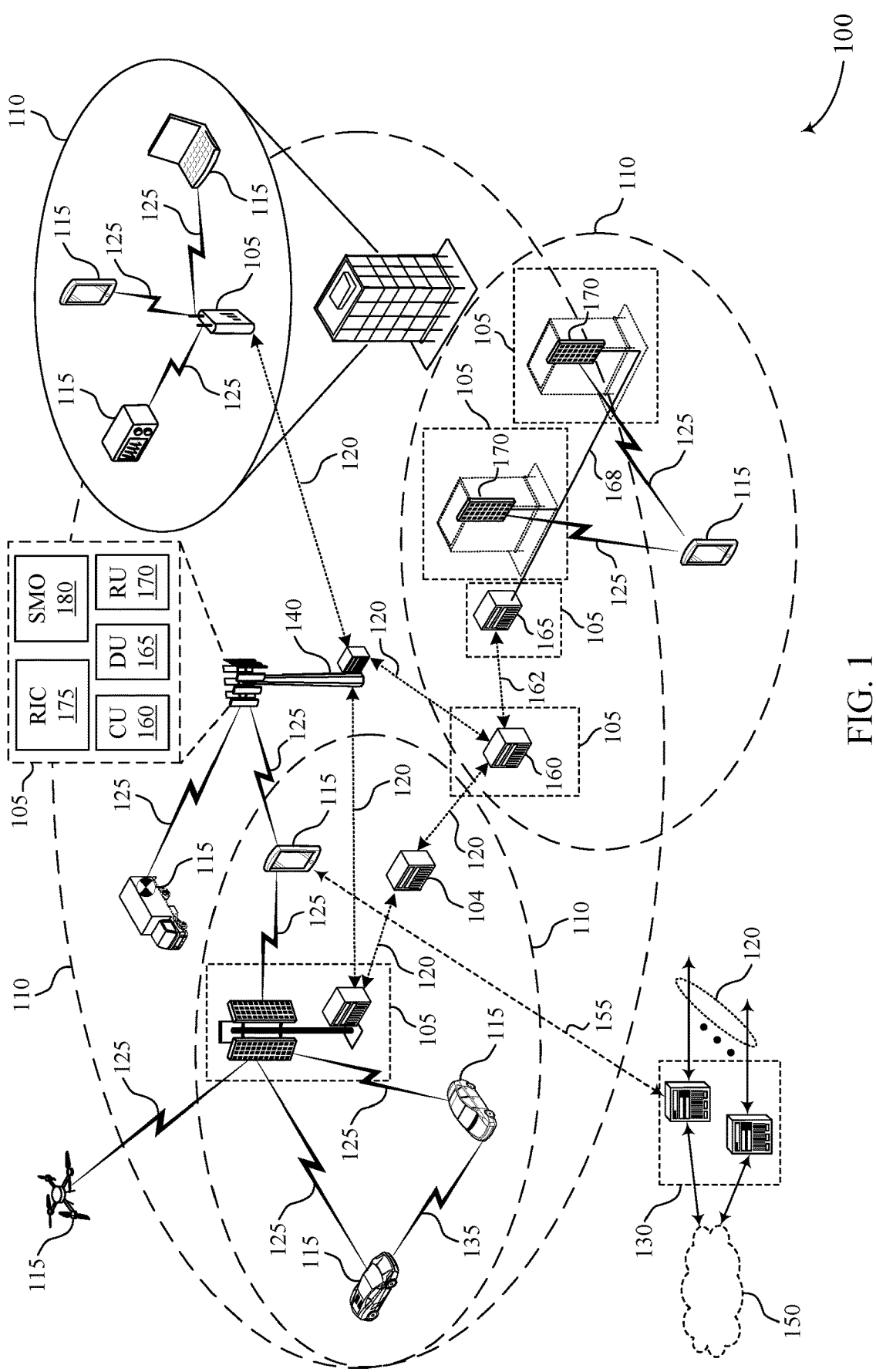
FIG. 1 illustrates an example of a wireless communications system that supports adaptive processing envelope based on channel conditions in accordance with one or more aspects of the present disclosure.

Some wireless communications systems may support baseband pooling, where processing resources may be allocated in pools to network entities. The processing resources may include hardware or software used to perform signal processing (e.g., memory or internal processing resources). A pool of processing resources allocated to a network entity may be referred to as a baseband resource envelope. A baseband resource envelope may be a virtualization of a pool of processing resources and may refer to resources (e.g., physical resources) for which a network entity may perform signal processing. For instance, a baseband resource envelope may include a number of layers, a number of component carriers (e.g., per layer), and a range of frequency resources (e.g., per component carrier). A network entity may then perform signal processing for a baseband resource envelope, and the signal processing may not be expected to exceed a maximum capacity of a pool of processing resources corresponding to the baseband resource envelope.

In some aspects, a distributed unit (DU) or a baseband unit (BBU) may be configured with a baseband resource envelope for signal processing, and the DU may be connected to one or more radio units (RUs). The DU may allocate its baseband resource envelope to the one or more RUs in one or more sub-envelopes, and the DU may perform signal processing for each RU in accordance with the sub-envelope allocated to the RU. The signal processing performed by the DU for an RU may support communications between the RU and one or more user equipment (UEs). In some cases, however, the baseband resource envelope configured at the DU may be static (e.g., a static envelope configuration). Accordingly, a network may have limited abilities to adapt the baseband resource envelope allocated to a DU, and the DU may not use a pool of processing resources corresponding to the baseband resource envelope in an efficient manner.

In an example, a DU may have limited abilities to adapt to changing conditions for providing communications for one or more UEs. If signal processing performed at a DU based on a baseband resource envelope allocated to the DU uses less processing resources than expected due to favorable channel conditions, a pool of processing resources corresponding to (e.g., allocated for) the baseband resource envelope may be underutilized. Alternatively, if signal processing performed at a DU based on a baseband resource envelope allocated to the DU uses more processing resources than expected due to unfavorable channel conditions, a pool of processing resources corresponding to (e.g., allocated for) the baseband resource envelope may be overutilized. In some cases, if an operator decides to expand a network to support communications with additional UEs, the operator may invest in additional processing resources (e.g., hardware or software) to facilitate the expansion since the usage of processing resources may not be used efficiently, resulting in an increase in capital expenses (CAPEX) associated with the network entities.

As described herein, a wireless communications system may support efficient techniques for dynamically adapting a baseband resource envelope (e.g., baseband resources) allocated to a DU. A virtual radio access network (VRAN) manager (e.g., a host platform for a VRAN) may perform baseband pooling to allocate a baseband resource envelope to a DU for signal processing at the DU. The DU may perform measurements indicating the channel conditions associated with communicating with one or more UEs, and the DU may report the measurements to the VRAN manager. The VRAN manager may then adapt a baseband resource envelope allocated to the DU based on the measurements to more efficiently utilize processing resources. For instance, if channel conditions are favorable, the VRAN manager may allocate more baseband resources to the DU, since the DU may be capable of performing signal processing for the additional baseband resources (e.g., additional layers or bandwidth). Otherwise, the VRAN manager may allocate fewer baseband resources to the DU.

Aspects of the disclosure are initially described in the context of wireless communications systems. Examples of processes and signaling exchanges that support an adaptive processing envelope based on channel conditions are then described. Aspects of the disclosure are further illustrated by and described with reference to apparatus diagrams, system diagrams, and flowcharts that relate to an adaptive processing envelope based on channel conditions.

FIG. 1 illustrates an example of a wireless communications system 100 that supports an adaptive processing envelope based on channel conditions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support adaptive processing envelope based on power consumption as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink control channel (PDCCH) or a physical downlink shared channel (PDSCH)), uplink transmissions (e.g., return link transmissions) from a UE 115 to a network entity 105 (e.g., in a physical uplink control channel (PUCCH) or a physical uplink shared channel (PUSCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support efficient techniques for dynamically adapting a baseband resource envelope (e.g., baseband resources) allocated to a network entity 105. A VRAN manager (e.g., a host platform for a VRAN) may perform baseband pooling to allocate a baseband resource envelope to a network entity 105 for signal processing at the network entity 105. The network entity 105 may perform measurements indicating the channel conditions associated with communicating with one or more UEs 115, and the network entity 105 may report the measurements to the VRAN manager. The VRAN manager may then adapt a baseband resource envelope allocated to the network entity 105 based on the measurements to more efficiently use processing resources. For instance, if channel conditions are favorable, the VRAN manager may allocate more baseband resources to the network entity 105, since the network entity 105 may be capable of performing signal processing for the additional baseband resources (e.g., additional layers or bandwidth). Otherwise, the VRAN manager may allocate fewer baseband resources to the network entity 105.

Figure 2:
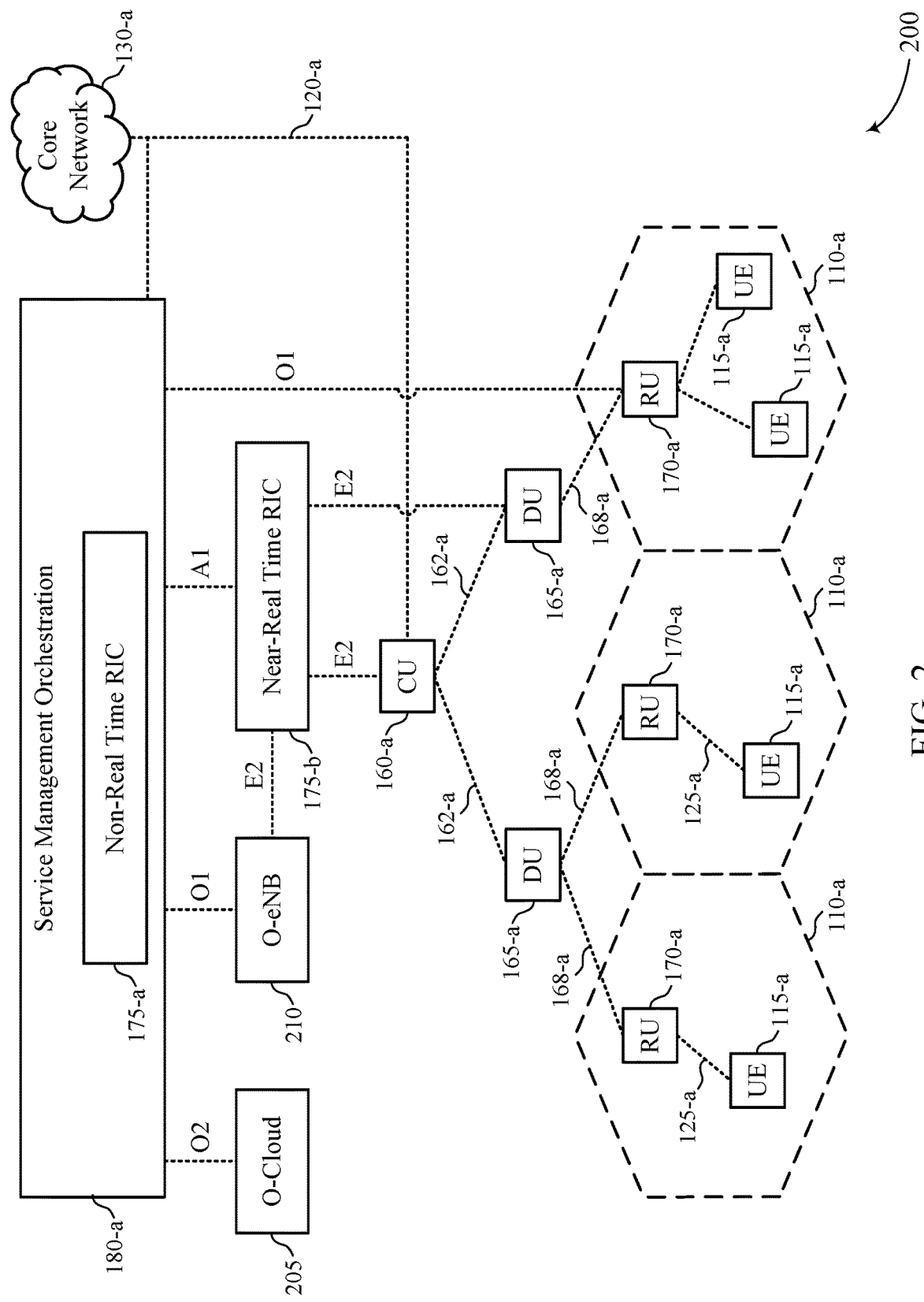
FIG. 2 illustrates an example of a network architecture that supports adaptive processing envelope based on channel conditions in accordance with one or more aspects of the present disclosure.

FIG. 2 illustrates an example of a network architecture 200 (e.g., a disaggregated base station architecture, a disaggregated RAN architecture) that supports adaptive processing envelope based on channel conditions in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g. via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support efficient techniques for dynamically adapting a baseband resource envelope (e.g., baseband resources) allocated to a DU 165. A VRAN manager (e.g., a host platform for a VRAN) may perform baseband pooling to allocate a baseband resource envelope to a DU 165 for signal processing at the DU 165. The DU 165 may perform measurements indicating the channel conditions associated with communicating with one or more UEs 115, and the DU 165 may report the measurements to the VRAN manager. The VRAN manager may then adapt a baseband resource envelope allocated to the DU 165 based on the measurements to more efficiently use processing resources. For instance, if channel conditions are favorable, the VRAN manager may allocate more baseband resources to the DU 165, since the DU 165 may be capable of performing signal processing for the additional baseband resources (e.g., additional layers or bandwidth). Otherwise, the VRAN manager may allocate less baseband resources to the DU 165.

Figure 3:
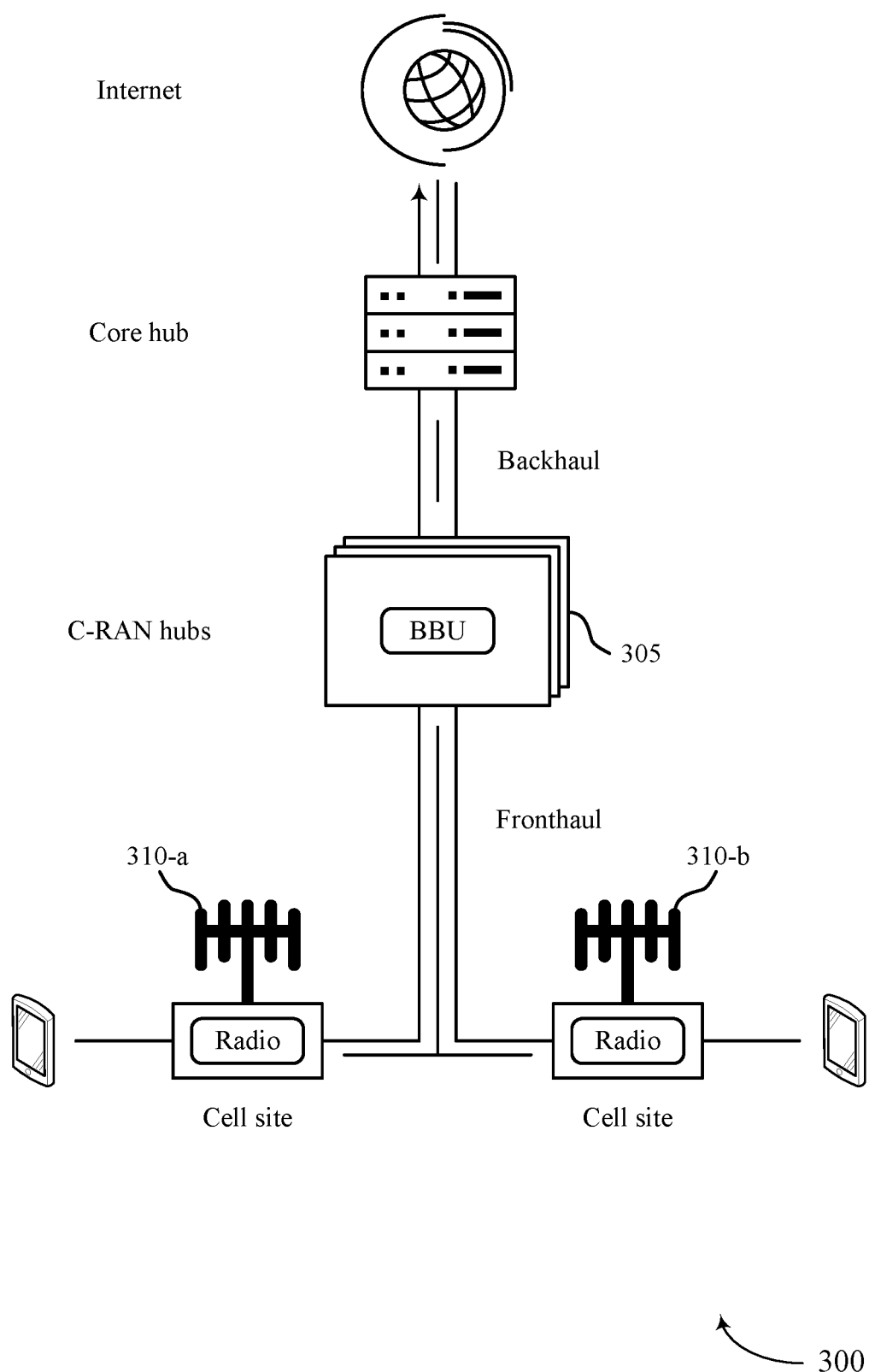
FIG. 3 illustrates an example of baseband pooling in accordance with one or more aspects of the present disclosure.

FIG. 3 illustrates an example of baseband pooling 300 in accordance with one or more aspects of the present disclosure. In VRAN applications, where baseband pooling is utilized, a centralized BBU 305 (e.g., a DU) processes the physical layer of many non-collocated sites 310 (e.g., a first RU 310-*a* and a second RU 310-*b*). For the sake of CAPEX improvements, it may be useful to dimension the baseband capacity in the RAN to sub-envelope use cases of the system capacity, where it is not assumed that maximum capacity is achievable at all sites at any time. The CAPEX and achievable capacity may therefore be dictated by the actual RAN infrastructure and the baseband modems maximal layer one (L1) processing envelope. Further, there may be a system trade-off that permits adding L1 resources to the baseband pool at the expense of increasing CAPEX. Such an increase of L1 resources may also have a direct impact on overall RAN infrastructure power consumption and correspondingly on system operating expenses (OPEX). In some cases, power consumption may be a critical key performance indicator (KPI) for VRAN OPEX due to the implications of cooling and an L1 resource increase in the VRAN servers. The L1 PHY resource achievable envelope therefore becomes a critical parameter for VRAN cost structure optimization.

In VRAN applications with baseband pooling, the L1 physical resource envelope (e.g., baseband resource envelope) may be dimensioned into a quantity of layers, a quantity of frequency resources (e.g., MHz), and a quantity of component carriers (e.g., #layers*MHz*#component carriers). The L1 physical resource envelope may also be distributed between RUs (e.g., if more than a single RU is connected to a DU). When serving non-collocated sites (e.g., RUs), a BBU serving a massive MIMO site may likely demand a large quantity of layers (e.g., 16) with a low quantity of component carriers (e.g., 2), or a BBU serving non-massive MIMO sites (e.g., which have smaller layer dimensions) may likely demand a smaller quantity of layers (e.g., 8, 4, or 2) with a larger quantity of component carriers (e.g., 32, 16, or 8) for supporting many RUs. In some cases, a VRAN system may be provisioned based on a static envelope configuration of L1 resources (e.g., according to open RAN (ORAN) specifications or commercial VRAN implementations). Upon initialization of a carrier in VRAN, baseband resources may be allocated based on its supported envelope subject to a quantity of layers, a quantity of frequency resources (e.g., a bandwidth part (BWP) size of each carrier), and a quantity of component carriers supported by the envelope.

In some aspects, PHY processing may be profiled to support difficult but reasonable conditions. For instance, a VRAN manager may estimate an amount of PHY processing at a DU for supporting difficult but reasonable channel conditions. In some examples, the PHY processing may be profiled based on scheduling and channel conditions.

Scheduling considerations for PHY processing may include a maximum number of PUSCHs containing HARQ feedback when an uplink transmission is sent in an uplink slot where UEs 115 transmit PUSCH (e.g., maximum HARQ for multiple component carriers, slots, or codewords). Scheduling considerations for PHY processing may also include a maximum number of PUCCHs containing HARQ feedback when an uplink transmission is sent in an uplink slot where UEs avoid transmitting PUSCH. Scheduling considerations for PHY processing may also include information related to channel state information (CSI) reporting. Such information may include a CSI report processed with a time constraint to be decoded at a received slot, whether a CSI report is multiplexed with HARQ feedback (e.g., supporting an acknowledgment (ACK) delay), or whether the CSI report includes two parts in a PUSCH (e.g., supporting an uplink data delay).

Channel condition considerations for PHY processing may include a propagation to UEs 115 (e.g., Doppler shift, Doppler spread, coherence time, or frequency) that may influence channel processing. Channel condition considerations for PHY processing may also include beams and respective channels for UEs 115 that may influence processing of spatial separation between the UEs 115.

After identifying a profile for PHY processing, a VRAN manager may allocate a resource envelope to a DU. Thus, the resource envelope may be estimated based on difficult but reasonable conditions, and an upper limit of an envelope profile for a DU based on statistics and scheduling constraints may be specifically coordinated or negotiated between a PHY layer and a MAC layer. In some cases, however, channel conditions reflecting demodulation processing and spatial separation processing may be more difficult to specify and coordinate. Further, changing channel conditions may change a processing load and affect a resource envelope. As described herein, a wireless communications system may support resource envelope adaptation based on channel conditions to more efficiently use processing resources.

Figure 4:
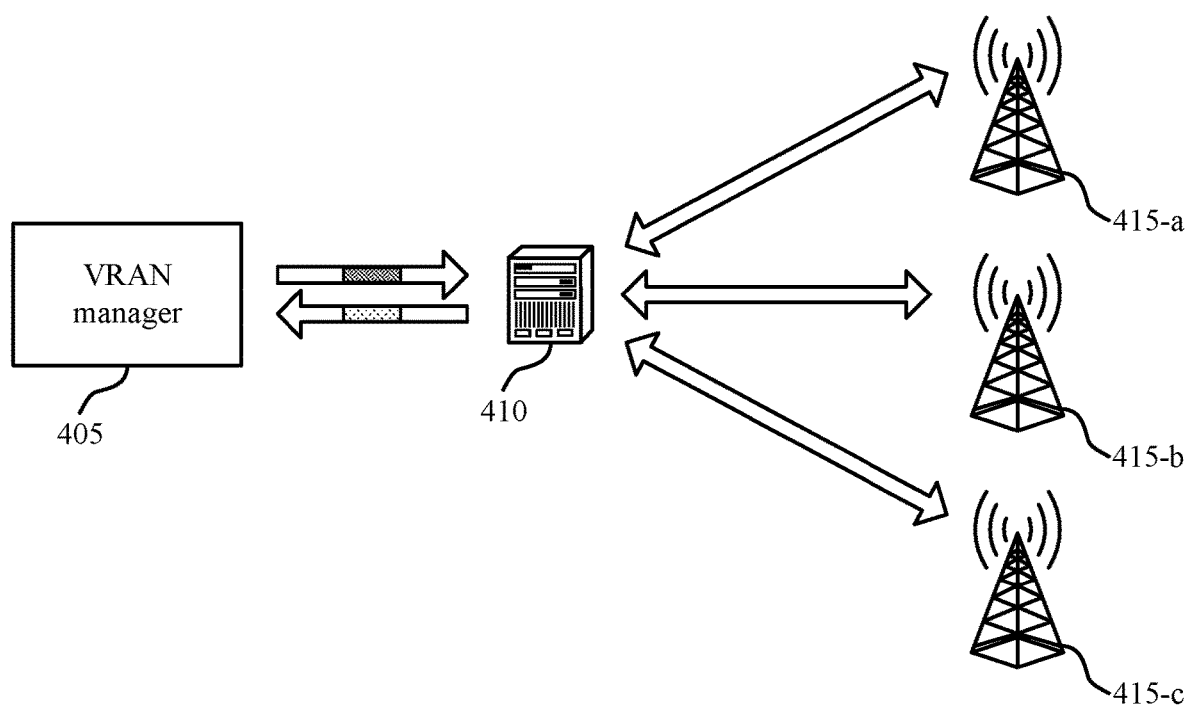
FIG. 4 illustrates an example of a wireless communications system that supports adaptive processing envelope based on channel conditions in accordance with one or more aspects of the present disclosure.

FIG. 4 illustrates an example of a wireless communications system 400 that supports an adaptive processing envelope based on channel conditions in accordance with one or more aspects of the present disclosure. The wireless communications system 400 includes a VRAN manager 405, which may be an example of a VRAN manager, network entity, or higher layer described with reference to FIGS. 1-3. The wireless communications system 400 also includes a DU 410, which may be an example of a DU or a network entity described with reference to FIGS. 1-3. The wireless communications system 400 also includes an RU 415-a, an RU 415-b, and an RU 415-c, which may be examples of RUs or network entities 105 described with reference to FIGS. 1-3. The wireless communications system 400 may implement aspects of the wireless communications system 100 or the network architecture 200. For instance, the wireless communications system 400 may support efficient techniques for dynamically adapting a baseband resource envelope (e.g., baseband resources) allocated to the DU 410.

The VRAN manager 405 may provide an initial configuration of a resource envelope 420 (e.g., baseband resource envelope) for signal processing at the DU 410. The DU 410 may provide processing values (e.g., memory or internal resources) per allocated resources to the VRAN manager 405, and the VRAN manager 405 may identify the initial configuration of the resource envelope for the DU 410 based on the processing values provided by the DU 410. After the initial configuration of the resource envelope 420 at the DU 410, the VRAN manager 405 may use the techniques described herein to reconfigure the resource envelope 420 at the DU 410. The described techniques include reporting relevant channel conditions that reflect a processing load at the DU 410 and translating or calibrating those channel conditions to determine a processing load at the DU 410 and adapt a resource envelope at the DU 410.

In some aspects, the wireless communications system 400 may introduce PHY based reports 425 from the DU 410 to the VRAN manager 405 (e.g., a higher layer) based on channel conditions (e.g., a method to report based on channel conditions may be introduced). In some cases, the DU 410 may include, in a report 425 for the VRAN manager 405, an indication of channel conditions per UE 115 (e.g., each UE 115 for which the DU 410 performs signal processing). The indication of the channel conditions may include an indication of Doppler spread or noise coherence bandwidth. In some cases, the DU 410 may include, in a report 425 for the VRAN manager 405, an indication of inter-UE channel correlation. The indication of inter-UE channel correlation may include covariance or channel correlation associated with signals processed for one or more UEs. Higher inter-UE channel correlation may lead to less processing at the DU 410, while lower inter-UE channel correlation may lead to more processing at the DU 410. In some cases, the DU 410 may include, in a report 425 for the VRAN manager 405, an estimated lower bound for receiver parameters (e.g., L1 Equalizer frequency or time decimation). The DU 410 may also indicate, in a report 425, actual processing or a level of processing resource utilization (e.g., percentage of processing resources used) for channel conditions of previous slots (e.g., related to previous slots conditions).

The VRAN manager may receive the reports of channel conditions from the DU 410, and the VRAN manager may estimate a processing load at the DU 410. For instance, an estimation entity may be introduced at the VRAN manager 405 to support a method for estimating a processing load at the DU 410. The VRAN manager 405 may receive physical-based reports 425 and lower bound estimates from a PHY layer from the DU 410, and the VRAN manager 405 may combine the reports 425 and estimates with information on scheduling conditions (e.g., based on uplink control information (UCI) on a physical uplink shared channel (PUSCH)) to identify a suitable resource envelope 420 for the DU 410. The VRAN manager 405 may increase or decrease a resource envelope 420 allocated to the DU 410 based on the scheduling conditions plus estimated processing requirements at the DU 410 (e.g., refined with calibrated processing of previous slots).

After identifying a reconfigured resource envelope 420 for the DU 410, the VRAN manager may notify the DU 410 of the reconfigured resource envelope 420 (e.g., reducing memory, reducing energy consumption, reparsing internal processing resources) based on the reports 425 or estimates received from the DU 410. That is, the wireless communications system 400 may support a method to adapt to a changed resource envelope 420. The reconfigured resource envelope 420 may include a number of layers, a number of component carriers, a BWP within the component carriers (e.g., centralized RANs (CRANs)), a number of scheduled UEs 115, spatial multiplexing between UEs, etc. Thus, in a CRAN, the described techniques may provide for processing pooling between CRANs.

Using the techniques described herein, a resource envelope 420 may be adapted to changing channel conditions (e.g., worsening channel conditions or improving channel conditions). Thus, a DU 410 may avoid experiencing failure to maintain a resource envelope. Further, for CRAN, a DU may maintain a resource envelope 420 under worsening channel conditions for processing (e.g., since the resource envelope 420 may be adapted), and a DU may be able to pool processing and resources with increased performance. In some examples, the DU 410 may send reports based on channel conditions to the VRAN manager 405 over a functional application platform interface (FAPI) or over an open RAN (ORAN) interface (e.g., depending on a structure or split of a network). The reports may contain the channel conditions and interactions among UEs 115. In some cases, the DU 410 and the VRAN manager 405 may support capability negotiation to support reporting. In such cases, the DU 410 may send the reports 425 if the DU 410 is capable of supporting the adaptation of resource envelopes. In some cases, a processing concept (e.g., FAPI) may be introduced and processing capabilities for the DU 410 may be introduced (e.g., similar to UE processing capabilities). In such cases, the VRAN manager 405 may provide a resource envelope 420 and notify the DU 410.

Figure 5:
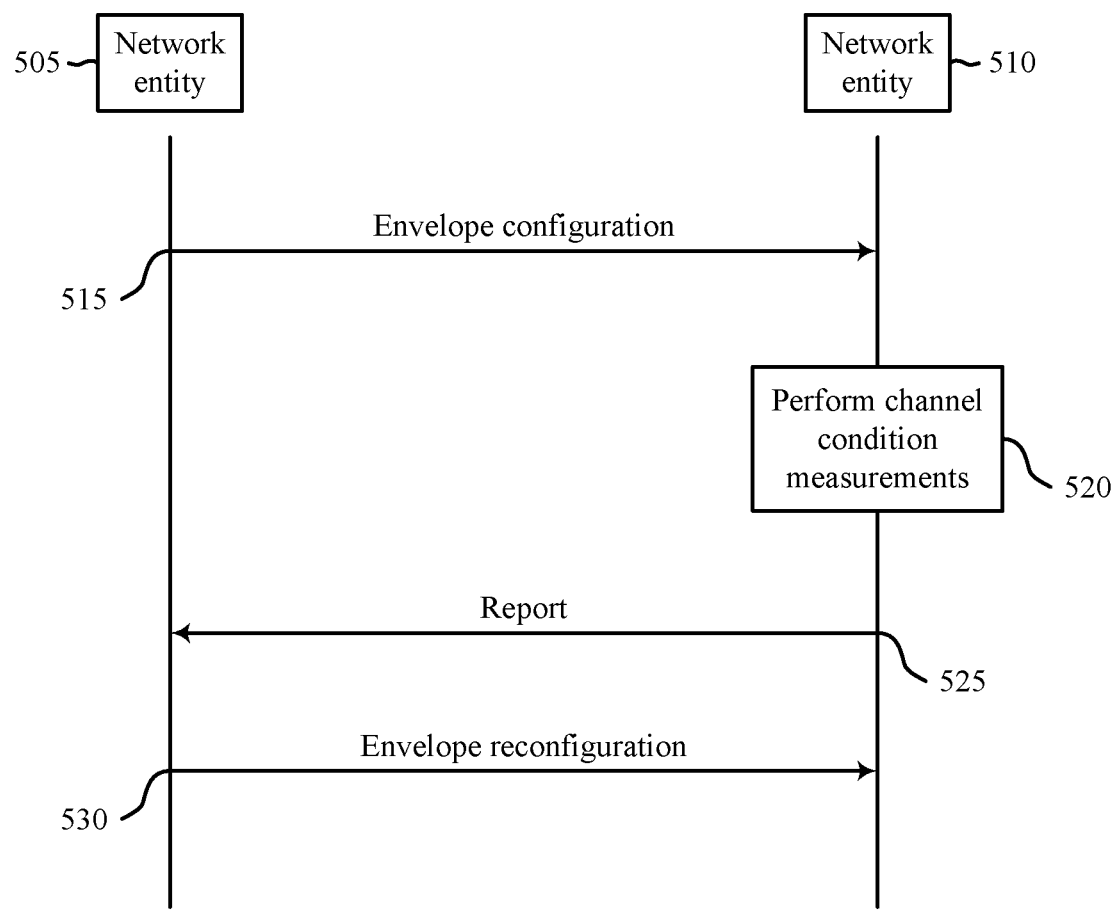
FIG. 5 illustrates an example of a process flow that supports adaptive processing envelope based on channel conditions in accordance with one or more aspects of the present disclosure.

FIG. 5 illustrates an example of a process flow 500 that supports adaptive processing envelope based on channel conditions in accordance with one or more aspects of the present disclosure. The process flow 500 includes a network entity 505, which may be an example of a network entity, VRAN manager, or higher layer described with reference to FIGS. 1-4. The process flow 500 also includes a network entity 510, which may be an example of a network entity or DU described with reference to FIGS. 1-4. The process flow 500 may implement aspects of the wireless communications system 100. For example, the process flow 500 may support efficient techniques for dynamically adapting a baseband resource envelope (e.g., baseband resources) allocated to the network entity 510.

In the following description of the process flow 500, the signaling exchanged between the network entity 505 and the network entity 510 may be exchanged in a different order than the example order shown, or the operations performed by the network entity 505 and the network entity 510 may be performed in different orders or at different times. Some operations may also be omitted from the process flow 500, and other operations may be added to the process flow 500.

At 515, the network entity 505 may transmit, and the network entity 510 may receive, a first indication of a first processing envelope (e.g., baseband resource envelope) for signal processing at the network entity 510. The signal processing may be associated with communicating with one or more UEs 115. At 520, the network entity 510 may perform one or more measurements indicating the channel conditions associated with communicating with the one or more UEs 115. In some cases, the one or more measurements may include channel condition measurements associated with each UE of the one or more UEs 115, and the channel condition measurements may include measurements of a Doppler spread or a noise coherence bandwidth. In some cases, the one or more measurements may include inter-UE channel correlation measurements, and the inter-UE channel correlation measurements may include measurements of a covariance or a channel correlation. In some cases, the one or more measurements may include lower-bound measurements for receiver parameters, and the lower-bound measurements for receiver parameters may include measurements of an equalizer frequency or time decimation.

At 525, the network entity 510 may transmit, and the network entity 505 may receive, a report based on the channel conditions associated with communicating with the one or more UEs 115. For instance, the network entity 510 may include the one or more measurements indicating the channel conditions in the report. In some cases, the network entity 510 may transmit, and the network entity 505 may receive, an indication of a level of resource utilization of processing resources at the network entity 510. The level of resource utilization may be based on the channel conditions associated with communicating with the one or more UEs 115. At 530, the network entity 505 may transmit, and the network entity 510 may receive, a second indication of a second processing envelope (e.g., baseband resource envelope) for signal processing at the network entity 510, the second indication of the second processing envelope being in response to the report at 525.

In some cases, the second processing envelope may be based on the indication of the level of resource utilization of the processing resources at the network entity 510. For instance, a size of the second processing envelope may be greater than a size of the first processing envelope (e.g., include more physical resources than the first processing envelope) based on the level of resource utilization of the processing resources at the network entity 510 failing to satisfy a threshold (e.g., such that the network entity 510 may use more processing resources). Alternatively, a size of the second processing envelope may be less than a size of the first processing envelope (e.g., include less physical resources than the first processing envelope) based on the level of resource utilization of the processing resources satisfying a threshold (e.g., such that the network entity 510 may use less processing resources). In some cases, the network entity 510 may allocate, to another network entity (e.g., RU), a sub-envelope of the second processing envelope, the sub-envelope being for signal processing at the network entity 510 for communications at the other network entity (e.g., RU), and the sub-envelope being based on channel conditions at the other network entity.

Figure 6:
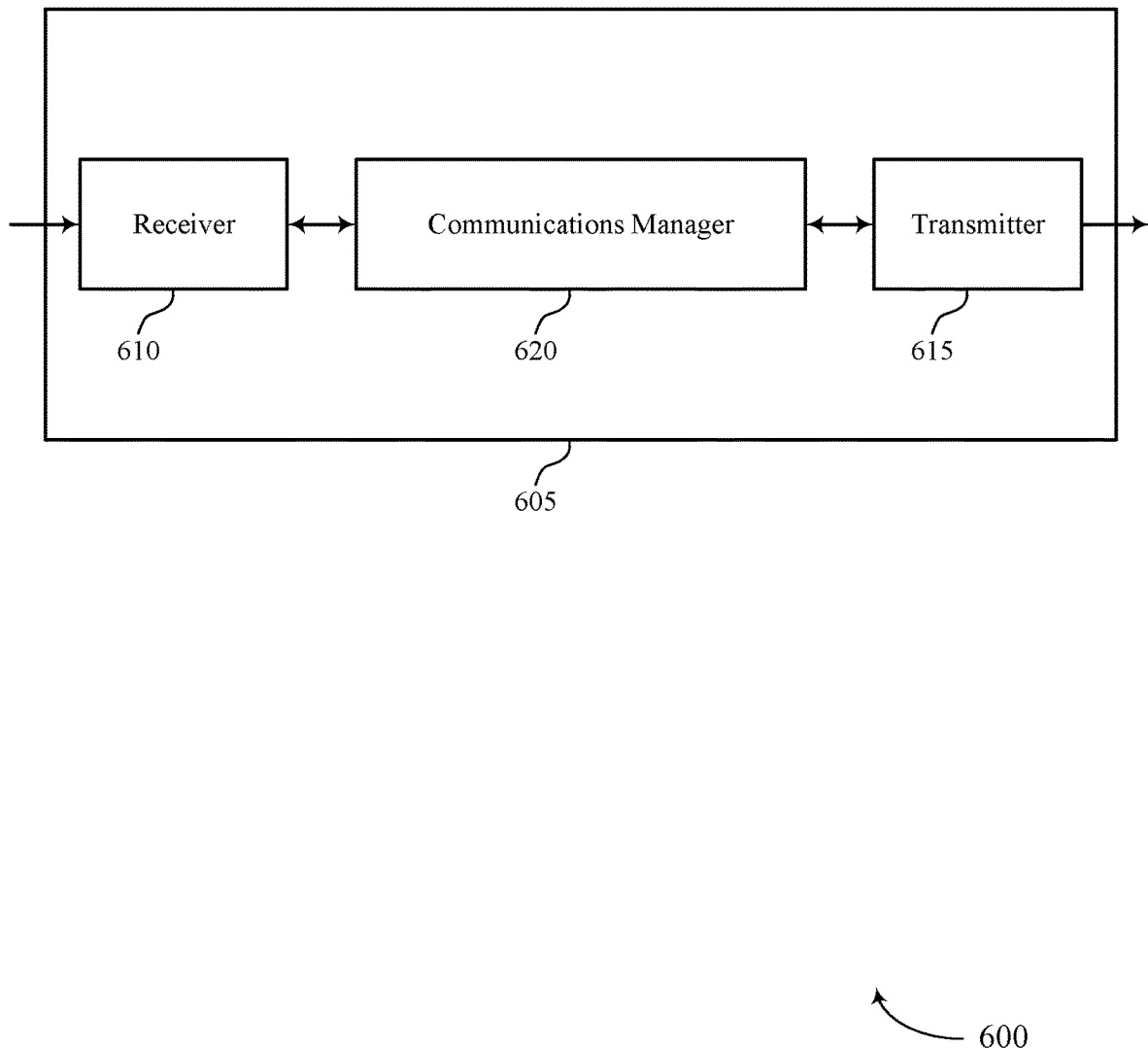
FIGS. 6 and 7 show block diagrams of devices that support adaptive processing envelope based on channel conditions in accordance with one or more aspects of the present disclosure.

FIG. 6 shows a block diagram 600 of a device 605 that supports adaptive processing envelope based on channel conditions in accordance with one or more aspects of the present disclosure. The device 605 may be an example of aspects of a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of adaptive processing envelope based on channel conditions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network entity in accordance with examples as disclosed herein. For example, the communications manager 620 may be configured as or otherwise support a means for receiving, from a second network entity, a first indication of a first processing envelope for signal processing at the first network entity, the signal processing associated with communicating with one or more UEs. The communications manager 620 may be configured as or otherwise support a means for transmitting, to the second network entity, a report based on channel conditions associated with communicating with the one or more UEs. The communications manager 620 may be configured as or otherwise support a means for receiving, from the second network entity, a second indication of a second processing envelope for signal processing at the first network entity, the second indication of the second processing envelope being in response to transmitting the report.

Additionally, or alternatively, the communications manager 620 may support wireless communication at a first network entity in accordance with examples as disclosed herein. For example, the communications manager 620 may be configured as or otherwise support a means for transmitting, to a second network entity, a first indication of a first processing envelope for signal processing at the second network entity, the signal processing associated with communicating with one or more UEs. The communications manager 620 may be configured as or otherwise support a means for receiving, from the second network entity, a report based on channel conditions associated with communicating with the one or more UEs. The communications manager 620 may be configured as or otherwise support a means for transmitting, to the second network entity, a second indication of a second processing envelope for signal processing at the second network entity, the second indication of the second processing envelope being in response to receiving the report.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reducing CAPEX and OPEX. In particular, because a network entity may transmit a report to another network entity indicating channel conditions, the other network entity may be able to reconfigure baseband resource envelopes in a network to more efficiently use processing resources and reduce CAPEX and OPEX.

Figure 7:
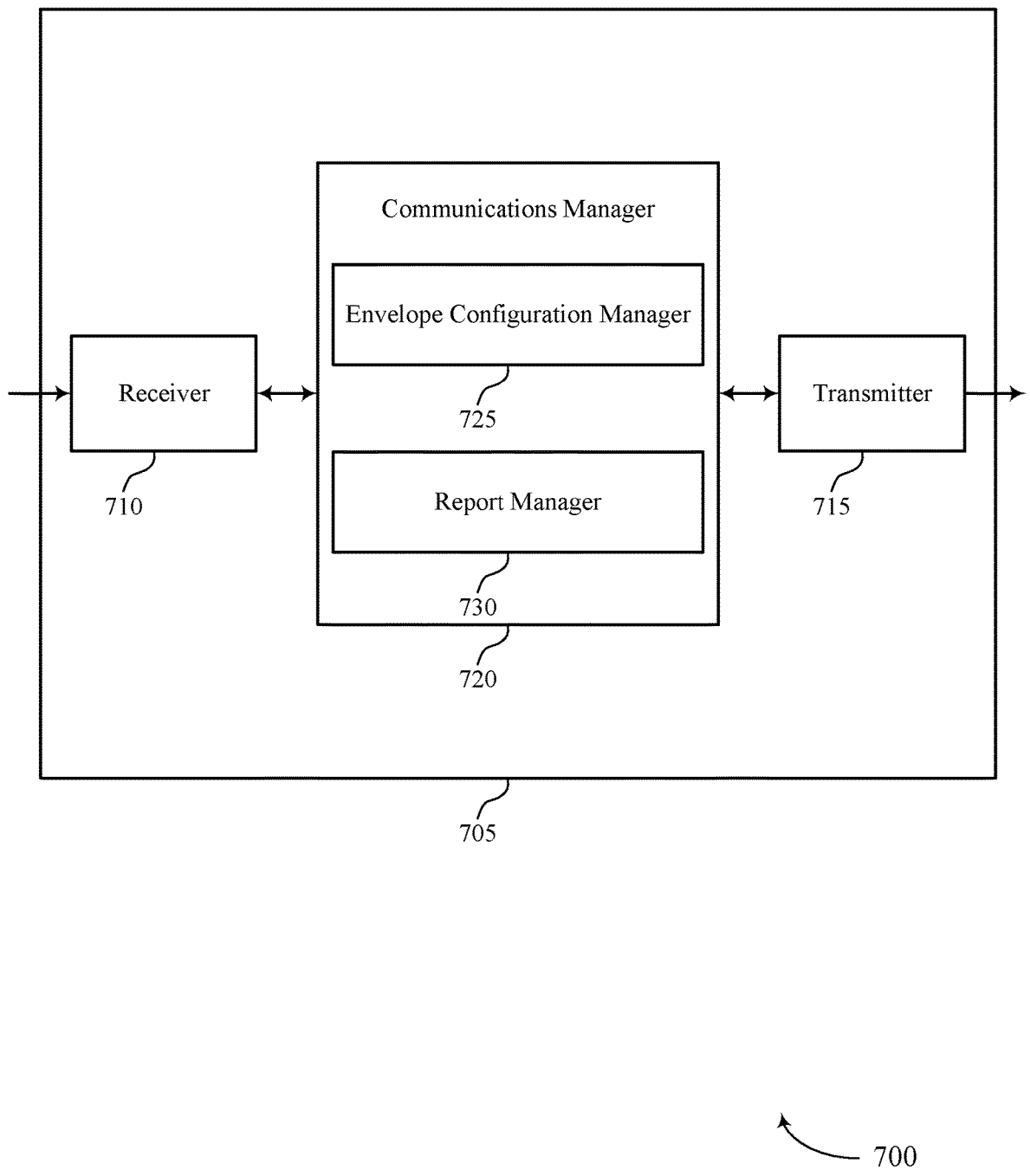

FIG. 7 shows a block diagram 700 of a device 705 that supports adaptive processing envelope based on channel conditions in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of adaptive processing envelope based on channel conditions as described herein. For example, the communications manager 720 may include an envelope configuration manager 725 a report manager 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first network entity in accordance with examples as disclosed herein. The envelope configuration manager 725 may be configured as or otherwise support a means for receiving, from a second network entity, a first indication of a first processing envelope for signal processing at the first network entity, the signal processing associated with communicating with one or more UEs. The report manager 730 may be configured as or otherwise support a means for transmitting, to the second network entity, a report based on channel conditions associated with communicating with the one or more UEs. The envelope configuration manager 725 may be configured as or otherwise support a means for receiving, from the second network entity, a second indication of a second processing envelope for signal processing at the first network entity, the second indication of the second processing envelope being in response to transmitting the report.

Additionally, or alternatively, the communications manager 720 may support wireless communication at a first network entity in accordance with examples as disclosed herein. The envelope configuration manager 725 may be configured as or otherwise support a means for transmitting, to a second network entity, a first indication of a first processing envelope for signal processing at the second network entity, the signal processing associated with communicating with one or more UEs. The report manager 730 may be configured as or otherwise support a means for receiving, from the second network entity, a report based on channel conditions associated with communicating with the one or more UEs. The envelope configuration manager 725 may be configured as or otherwise support a means for transmitting, to the second network entity, a second indication of a second processing envelope for signal processing at the second network entity, the second indication of the second processing envelope being in response to receiving the report.

Figure 8:
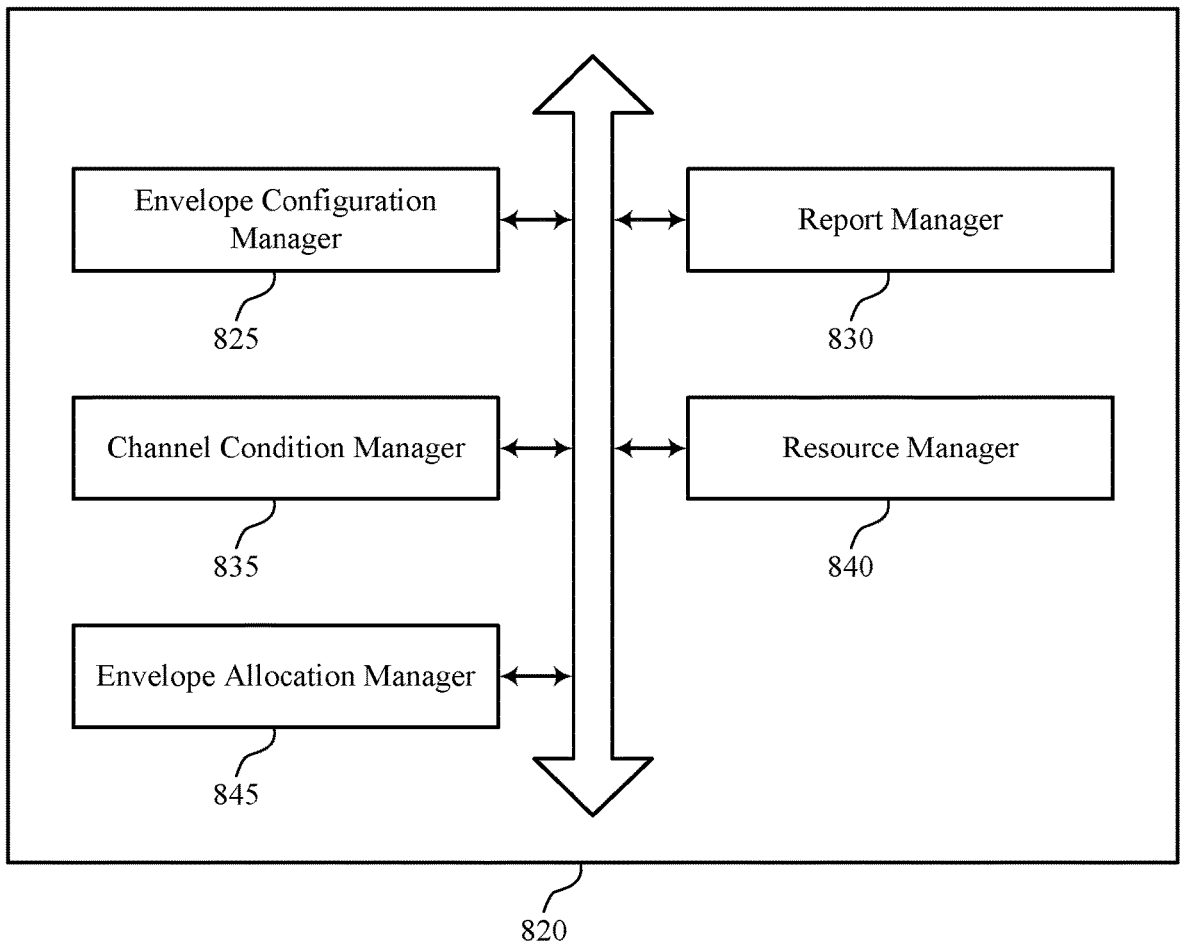
FIG. 8 shows a block diagram of a communications manager that supports adaptive processing envelope based on channel conditions in accordance with one or more aspects of the present disclosure.

FIG. 8 shows a block diagram 800 of a communications manager 820 that supports adaptive processing envelope based on channel conditions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of adaptive processing envelope based on channel conditions as described herein. For example, the communications manager 820 may include an envelope configuration manager 825, a report manager 830, a channel condition manager 835, a resource manager 840, an envelope allocation manager 845, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication at a first network entity in accordance with examples as disclosed herein. The envelope configuration manager 825 may be configured as or otherwise support a means for receiving, from a second network entity, a first indication of a first processing envelope for signal processing at the first network entity, the signal processing associated with communicating with one or more UEs. The report manager 830 may be configured as or otherwise support a means for transmitting, to the second network entity, a report based on channel conditions associated with communicating with the one or more UEs. In some examples, the envelope configuration manager 825 may be configured as or otherwise support a means for receiving, from the second network entity, a second indication of a second processing envelope for signal processing at the first network entity, the second indication of the second processing envelope being in response to transmitting the report.

In some examples, the channel condition manager 835 may be configured as or otherwise support a means for performing one or more measurements indicating the channel conditions associated with communicating with the one or more UEs, where transmitting the report includes. In some examples, the report manager 830 may be configured as or otherwise support a means for transmitting the one or more measurements indicating the channel conditions in the report.

In some examples, the one or more measurements include channel condition measurements associated with each UE of the one or more UEs, the channel condition measurements including measurements of a Doppler spread, a noise coherence bandwidth, or a combination thereof.

In some examples, the one or more measurements include inter-UE channel correlation measurements, the inter-UE channel correlation measurements including measurements of a covariance, a channel correlation, or a combination thereof.

In some examples, the one or more measurements include lower-bound measurements for receiver parameters, the lower-bound measurements for receiver parameters including measurements of an equalizer frequency, a time decimation, or a combination thereof.

In some examples, the resource manager 840 may be configured as or otherwise support a means for transmitting, to the second network entity, an indication of a level of resource utilization of processing resources at the first network entity, the level of resource utilization being based on the channel conditions associated with communicating with the one or more UEs, and the second processing envelope being further based on transmitting the indication of the level of resource utilization.

In some examples, a size of the second processing envelope is greater than a size of the first processing envelope based on the level of resource utilization of the processing resources failing to satisfy a threshold.

In some examples, a size of the second processing envelope is less than or equal to a size of the first processing envelope based on the level of resource utilization of the processing resources satisfying a threshold.

In some examples, the envelope allocation manager 845 may be configured as or otherwise support a means for allocating, to a radio unit, a sub-envelope of the second processing envelope, the sub-envelope being for signal processing at the first network entity for communications at the radio unit, and the sub-envelope being based on channel conditions at the radio unit.

In some examples, the first network entity includes a distributed unit or a baseband unit, and the second network entity includes a higher layer, a virtual radio access network manager, or a host platform for a virtual radio access network entity.

Additionally, or alternatively, the communications manager 820 may support wireless communication at a first network entity in accordance with examples as disclosed herein. In some examples, the envelope configuration manager 825 may be configured as or otherwise support a means for transmitting, to a second network entity, a first indication of a first processing envelope for signal processing at the second network entity, the signal processing associated with communicating with one or more UEs. In some examples, the report manager 830 may be configured as or otherwise support a means for receiving, from the second network entity, a report based on channel conditions associated with communicating with the one or more UEs. In some examples, the envelope configuration manager 825 may be configured as or otherwise support a means for transmitting, to the second network entity, a second indication of a second processing envelope for signal processing at the second network entity, the second indication of the second processing envelope being in response to receiving the report.

In some examples, to support receiving the report, the channel condition manager 835 may be configured as or otherwise support a means for receiving, in the report, one or more measurements indicating the channel conditions associated with communicating with the one or more UEs.

In some examples, the one or more measurements include channel condition measurements associated with each UE of the one or more UEs, the channel condition measurements including measurements of a Doppler spread, a noise coherence bandwidth, or a combination thereof.

In some examples, the one or more measurements include inter-UE channel correlation measurements, the inter-UE channel correlation measurements including measurements of a covariance, a channel correlation, or a combination thereof.

In some examples, the one or more measurements include lower-bound measurements for receiver parameters, the lower-bound measurements for receiver parameters including measurements of an equalizer frequency, a time decimation, or a combination thereof.

In some examples, the resource manager 840 may be configured as or otherwise support a means for receiving, from the second network entity, an indication of a level of resource utilization of processing resources at the second network entity, the level of resource utilization being based on the channel conditions associated with communicating with the one or more UEs, and the second processing envelope being further based on receiving the indication of the level of resource utilization.

In some examples, a size of the second processing envelope is greater than a size of the first processing envelope based on the level of resource utilization of the processing resources failing to satisfy a threshold.

In some examples, a size of the second processing envelope is less than or equal to a size of the first processing envelope based on the level of resource utilization of the processing resources satisfying a threshold.

In some examples, the envelope allocation manager 845 may be configured as or otherwise support a means for allocating, to a radio unit, a sub-envelope of the second processing envelope, the sub-envelope being for signal processing at the second network entity for communications at the radio unit, and the sub-envelope being based on channel conditions at the radio unit.

In some examples, the first network entity includes a higher layer, a virtual radio access network manager, or a host platform for a virtual radio access network entity, and the second network entity includes a distributed unit or a baseband unit.

Figure 9:
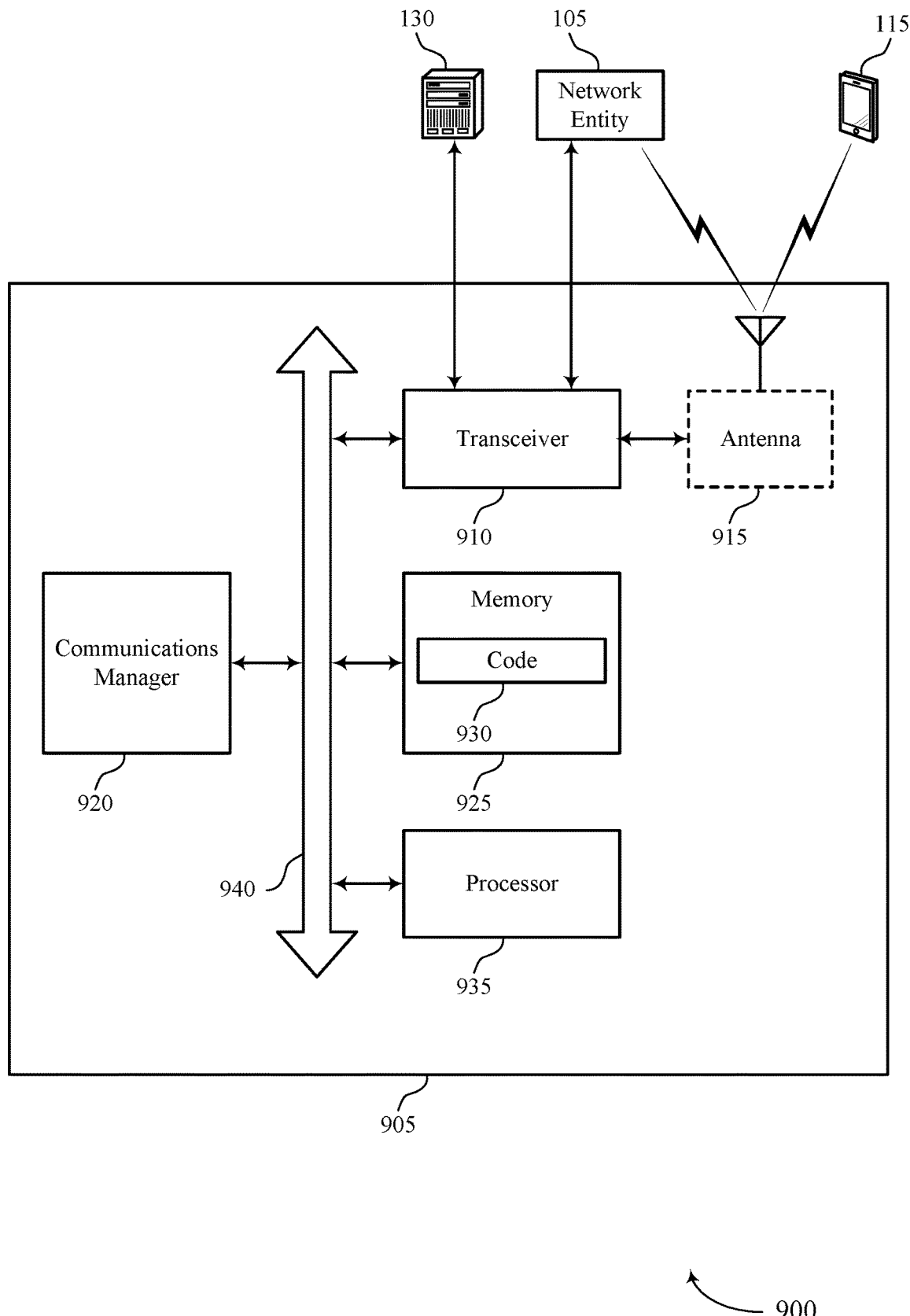
FIG. 9 shows a diagram of a system including a device that supports adaptive processing envelope based on channel conditions in accordance with one or more aspects of the present disclosure.

FIG. 9 shows a diagram of a system 900 including a device 905 that supports adaptive processing envelope based on channel conditions in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. The transceiver 910, or the transceiver 910 and one or more antennas 915 or wired interfaces, where applicable, may be an example of a transmitter 615, a transmitter 715, a receiver 610, a receiver 710, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting adaptive processing envelope based on channel conditions). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communication at a first network entity in accordance with examples as disclosed herein. For example, the communications manager 920 may be configured as or otherwise support a means for receiving, from a second network entity, a first indication of a first processing envelope for signal processing at the first network entity, the signal processing associated with communicating with one or more UEs. The communications manager 920 may be configured as or otherwise support a means for transmitting, to the second network entity, a report based on channel conditions associated with communicating with the one or more UEs. The communications manager 920 may be configured as or otherwise support a means for receiving, from the second network entity, a second indication of a second processing envelope for signal processing at the first network entity, the second indication of the second processing envelope being in response to transmitting the report.

Additionally, or alternatively, the communications manager 920 may support wireless communication at a first network entity in accordance with examples as disclosed herein. For example, the communications manager 920 may be configured as or otherwise support a means for transmitting, to a second network entity, a first indication of a first processing envelope for signal processing at the second network entity, the signal processing associated with communicating with one or more UEs. The communications manager 920 may be configured as or otherwise support a means for receiving, from the second network entity, a report based on channel conditions associated with communicating with the one or more UEs. The communications manager 920 may be configured as or otherwise support a means for transmitting, to the second network entity, a second indication of a second processing envelope for signal processing at the second network entity, the second indication of the second processing envelope being in response to receiving the report.

By including or configuring the communications manager 920 in accordance with examples as described herein, the device 905 may support techniques for reducing CAPEX and OPEX. In particular, because a network entity may transmit a report to another network entity indicating channel conditions, the other network entity may be able to reconfigure baseband resource envelopes in a network to more efficiently use processing resources and reduce CAPEX and OPEX.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the processor 935, the memory 925, the code 930, the transceiver 910, or any combination thereof. For example, the code 930 may include instructions executable by the processor 935 to cause the device 905 to perform various aspects of adaptive processing envelope based on channel conditions as described herein, or the processor 935 and the memory 925 may be otherwise configured to perform or support such operations.

Figure 10:
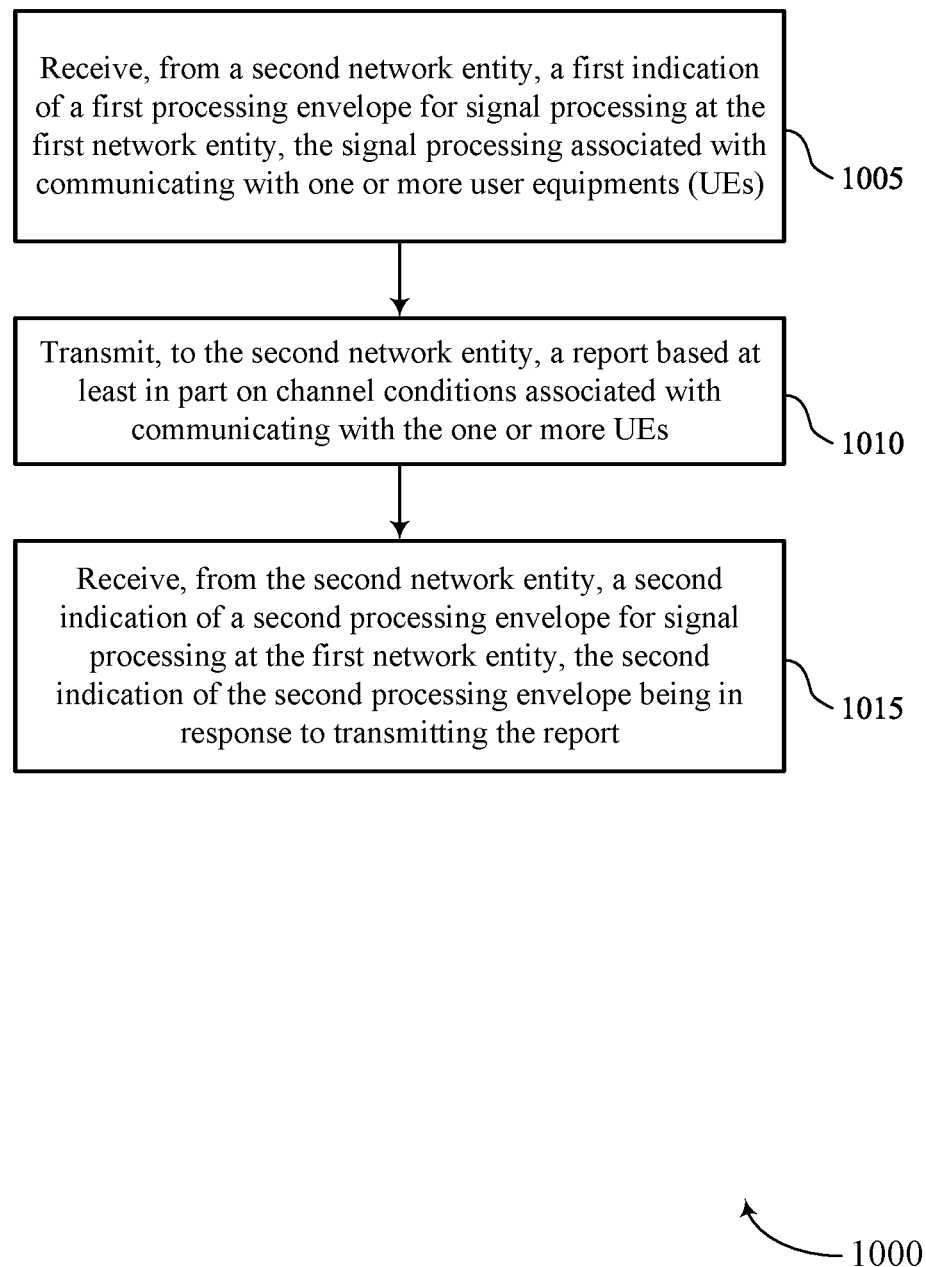
FIGS. 10 and 11 show flowcharts illustrating methods that support adaptive processing envelope based on channel conditions in accordance with one or more aspects of the present disclosure.

FIG. 10 shows a flowchart illustrating a method 1000 that supports adaptive processing envelope based on channel conditions in accordance with one or more aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include receiving, from a second network entity, a first indication of a first processing envelope for signal processing at the first network entity, the signal processing associated with communicating with one or more UEs. The operations of 1005 may be performed in accordance with examples as disclosed herein. In some examples, aspects of the operations of 1005 may be performed by an envelope configuration manager 825 as described with reference to FIG. 8.

At 1010, the method may include transmitting, to the second network entity, a report based on channel conditions associated with communicating with the one or more UEs. The operations of 1010 may be performed in accordance with examples as disclosed herein. In some examples, aspects of the operations of 1010 may be performed by a report manager 830 as described with reference to FIG. 8.

At 1015, the method may include receiving, from the second network entity, a second indication of a second processing envelope for signal processing at the first network entity, the second indication of the second processing envelope being in response to transmitting the report. The operations of 1015 may be performed in accordance with examples as disclosed herein. In some examples, aspects of the operations of 1015 may be performed by an envelope configuration manager 825 as described with reference to FIG. 8.

Figure 11:
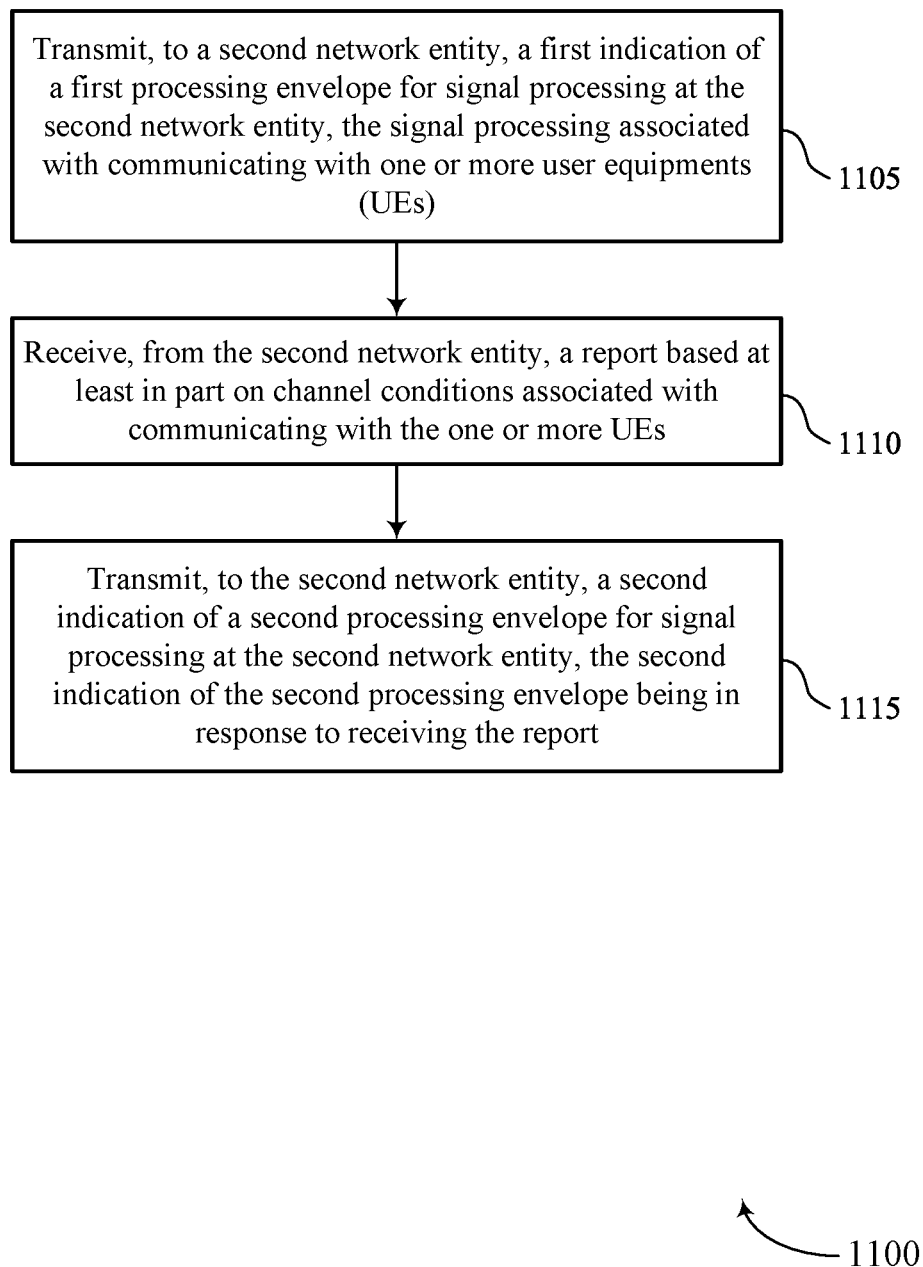

FIG. 11 shows a flowchart illustrating a method 1100 that supports adaptive processing envelope based on channel conditions in accordance with one or more aspects of the present disclosure. The operations of the method 1100 may be implemented by a network entity or its components as described herein. For example, the operations of the method 1100 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include transmitting, to a second network entity, a first indication of a first processing envelope for signal processing at the second network entity, the signal processing associated with communicating with one or more UEs. The operations of 1105 may be performed in accordance with examples as disclosed herein. In some examples, aspects of the operations of 1105 may be performed by an envelope configuration manager 825 as described with reference to FIG. 8.

At 1110, the method may include receiving, from the second network entity, a report based on channel conditions associated with communicating with the one or more UEs. The operations of 1110 may be performed in accordance with examples as disclosed herein. In some examples, aspects of the operations of 1110 may be performed by a report manager 830 as described with reference to FIG. 8.

At 1115, the method may include transmitting, to the second network entity, a second indication of a second processing envelope for signal processing at the second network entity, the second indication of the second processing envelope being in response to receiving the report. The operations of 1115 may be performed in accordance with examples as disclosed herein. In some examples, aspects of the operations of 1115 may be performed by an envelope configuration manager 825 as described with reference to FIG. 8.

The following provides an overview of aspects of the present disclosure:

Aspect 1: A method for wireless communication at a first network entity, comprising: receiving, from a second network entity, a first indication of a first processing envelope for signal processing at the first network entity, the signal processing associated with communicating with one or more UEs; transmitting, to the second network entity, a report based at least in part on channel conditions associated with communicating with the one or more UEs; and receiving, from the second network entity, a second indication of a second processing envelope for signal processing at the first network entity, the second indication of the second processing envelope being in response to transmitting the report.

Aspect 2: The method of aspect 1, further comprising: performing one or more measurements indicating the channel conditions associated with communicating with the one or more UEs, wherein transmitting the report comprises: transmitting the one or more measurements indicating the channel conditions in the report.

Aspect 3: The method of aspect 2, wherein the one or more measurements comprise channel condition measurements associated with each UE of the one or more UEs, the channel condition measurements comprising measurements of a Doppler spread, a noise coherence bandwidth, or a combination thereof Aspect 4: The method of any of aspects 2 through 3, wherein the one or more measurements comprise inter-UE channel correlation measurements, the inter-UE channel correlation measurements comprising measurements of a covariance, a channel correlation, or a combination thereof Aspect 5: The method of any of aspects 2 through 4, wherein the one or more measurements comprise lower-bound measurements for receiver parameters, the lower-bound measurements for receiver parameters comprising measurements of an equalizer frequency, a time decimation, or a combination thereof Aspect 6: The method of any of aspects 1 through 5, further comprising: transmitting, to the second network entity, an indication of a level of resource utilization of processing resources at the first network entity, the level of resource utilization being based at least in part on the channel conditions associated with communicating with the one or more UEs, and the second processing envelope being further based at least in part on transmitting the indication of the level of resource utilization.

Aspect 7: The method of aspect 6, wherein a size of the second processing envelope is greater than a size of the first processing envelope based at least in part on the level of resource utilization of the processing resources failing to satisfy a threshold.

Aspect 8: The method of any of aspects 6 through 7, wherein a size of the second processing envelope is less than or equal to a size of the first processing envelope based at least in part on the level of resource utilization of the processing resources satisfying a threshold.

Aspect 9: The method of any of aspects 1 through 8, further comprising: allocating, to a radio unit, a sub-envelope of the second processing envelope, the sub-envelope being for signal processing at the first network entity for communications at the radio unit, and the sub-envelope being based at least in part on channel conditions at the radio unit.

Aspect 10: The method of any of aspects 1 through 9, wherein the first network entity comprises a distributed unit or a baseband unit, and the second network entity comprises a higher layer, a virtual radio access network manager, or a host platform for a virtual radio access network entity.

Aspect 11: A method for wireless communication at a first network entity, comprising: transmitting, to a second network entity, a first indication of a first processing envelope for signal processing at the second network entity, the signal processing associated with communicating with one or more UEs; receiving, from the second network entity, a report based at least in part on channel conditions associated with communicating with the one or more UEs; and transmitting, to the second network entity, a second indication of a second processing envelope for signal processing at the second network entity, the second indication of the second processing envelope being in response to receiving the report.

Aspect 12: The method of aspect 11, wherein receiving the report comprises: receiving, in the report, one or more measurements indicating the channel conditions associated with communicating with the one or more UEs.

Aspect 13: The method of aspect 12, wherein the one or more measurements comprise channel condition measurements associated with each UE of the one or more UEs, the channel condition measurements comprising measurements of a Doppler spread, a noise coherence bandwidth, or a combination thereof Aspect 14: The method of any of aspects 12 through 13, wherein the one or more measurements comprise inter-UE channel correlation measurements, the inter-UE channel correlation measurements comprising measurements of a covariance, a channel correlation, or a combination thereof Aspect 15: The method of any of aspects 12 through 14, wherein the one or more measurements comprise lower-bound measurements for receiver parameters, the lower-bound measurements for receiver parameters comprising measurements of an equalizer frequency, a time decimation, or a combination thereof Aspect 16: The method of any of aspects 11 through 15, further comprising: receiving, from the second network entity, an indication of a level of resource utilization of processing resources at the second network entity, the level of resource utilization being based at least in part on the channel conditions associated with communicating with the one or more UEs, and the second processing envelope being further based at least in part on receiving the indication of the level of resource utilization.

Aspect 17: The method of aspect 16, wherein a size of the second processing envelope is greater than a size of the first processing envelope based at least in part on the level of resource utilization of the processing resources failing to satisfy a threshold.

Aspect 18: The method of any of aspects 16 through 17, wherein a size of the second processing envelope is less than or equal to a size of the first processing envelope based at least in part on the level of resource utilization of the processing resources satisfying a threshold.

Aspect 19: The method of any of aspects 11 through 18, further comprising: allocating, to a radio unit, a sub-envelope of the second processing envelope, the sub-envelope being for signal processing at the second network entity for communications at the radio unit, and the sub-envelope being based at least in part on channel conditions at the radio unit.

Aspect 20: The method of any of aspects 11 through 19, wherein the first network entity comprises a higher layer, a virtual radio access network manager, or a host platform for a virtual radio access network entity, and the second network entity comprises a distributed unit or a baseband unit.

Aspect 21: An apparatus for wireless communication at a first network entity, comprising a processor; memory coupled with the processor; and instructions stored in the memory and executable by the processor to cause the apparatus to perform a method of any of aspects 1 through 10.

Aspect 22: An apparatus for wireless communication at a first network entity, comprising at least one means for performing a method of any of aspects 1 through 10.

Aspect 23: A non-transitory computer-readable medium storing code for wireless communication at a first network entity, the code comprising instructions executable by a processor to perform a method of any of aspects 1 through 10.

Aspect 24: An apparatus for wireless communication at a first network entity, comprising a processor; memory coupled with the processor; and instructions stored in the memory and executable by the processor to cause the apparatus to perform a method of any of aspects 11 through 20.

Aspect 25: An apparatus for wireless communication at a first network entity, comprising at least one means for performing a method of any of aspects 11 through 20.

Aspect 26: A non-transitory computer-readable medium storing code for wireless communication at a first network entity, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
   a processor;
   memory coupled with the processor; and
   instructions stored in the memory and executable by the processor to cause the apparatus to:
      receive, from a second network entity, a first indication of a first processing envelope for signal processing at the first network entity, the signal processing associated with communicating with one or more user equipments (UEs);

perform one or more measurements indicating channel conditions associated with communicating with the one or more UEs;

transmit, to the second network entity, a report including the one or more measurements indicating the channel conditions associated with communicating with the one or more UEs, wherein the one or more measurements comprise lower-bound measurements for receiver parameters, the lower-bound measurements for the receiver parameters comprise measurements of an equalizer frequency, a time decimation, or a combination thereof; and receive, from the second network entity, a second indication of a second processing envelope for signal processing at the first network entity, the second indication of the second processing envelope being in response to transmitting the report.

2. The apparatus of claim 1, wherein the one or more measurements comprise channel condition measurements associated with each UE of the one or more UEs, the channel condition measurements comprising measurements of a Doppler spread, a noise coherence bandwidth, or a combination thereof.

3. The apparatus of claim 1, wherein the one or more measurements comprise inter-UE channel correlation measurements, the inter-UE channel correlation measurements comprising measurements of a covariance, a channel correlation, or a combination thereof.

4. The apparatus of claim 1, wherein the instructions are further executable by the processor to cause the apparatus to:
transmit, to the second network entity, an indication of a level of resource utilization of processing resources at the first network entity, the level of resource utilization being based at least in part on the channel conditions associated with communication with the one or more UEs, and the second processing envelope being further based at least in part on transmission of the indication of the level of resource utilization.

5. The apparatus of claim 4, wherein a size of the second processing envelope is greater than a size of the first processing envelope based at least in part on the level of resource utilization of the processing resources failing to satisfy a threshold.

6. The apparatus of claim 4, wherein a size of the second processing envelope is less than or equal to a size of the first processing envelope based at least in part on the level of resource utilization of the processing resources satisfying a threshold.

7. The apparatus of claim 1, wherein the instructions are further executable by the processor to cause the apparatus to:
allocate, to a radio unit, a sub-envelope of the second processing envelope, the sub-envelope being for signal processing at the first network entity for communications at the radio unit, and the sub-envelope being based at least in part on channel conditions at the radio unit.

8. The apparatus of claim 1, wherein the first network entity comprises a distributed unit or a baseband unit, and the second network entity comprises a higher layer, a virtual radio access network manager, or a host platform for a virtual radio access network entity.

9. An apparatus for wireless communication at a first network entity, comprising:
a processor;
memory coupled with the processor; and
instructions stored in the memory and executable by the processor to cause the apparatus to:
transmit, to a second network entity, a first indication of a first processing envelope for signal processing at the second network entity, the signal processing associated with communicating with one or more user equipments (UEs);

receive, from the second network entity, a report including one or more measurements indicating channel conditions associated with communicating with the one or more UEs, wherein the one or more measurements comprise lower-bound measurements for receiver parameters, the lower-bound measurements for the receiver parameters comprise measurements of an equalizer frequency, a time decimation, or a combination thereof; and transmit, to the second network entity, a second indication of a second processing envelope for signal processing at the second network entity, the second indication of the second processing envelope being in response to receiving the report.

10. The apparatus of claim 9, wherein the one or more measurements comprise channel condition measurements associated with each UE of the one or more UEs, the channel condition measurements comprising measurements of a Doppler spread, a noise coherence bandwidth, or a combination thereof.

11. The apparatus of claim 9, wherein the one or more measurements comprise inter-UE channel correlation measurements, the inter-UE channel correlation measurements comprising measurements of a covariance, a channel correlation, or a combination thereof.

12. The apparatus of claim 9, wherein the instructions are further executable by the processor to cause the apparatus to:
receive, from the second network entity, an indication of a level of resource utilization of processing resources at the second network entity, the level of resource utilization being based at least in part on the channel conditions associated with communication with the one or more UEs, and the second processing envelope being further based at least in part on reception of the indication of the level of resource utilization.

13. The apparatus of claim 12, wherein a size of the second processing envelope is greater than a size of the first processing envelope based at least in part on the level of resource utilization of the processing resources failing to satisfy a threshold.

14. The apparatus of claim 12, wherein a size of the second processing envelope is less than or equal to a size of the first processing envelope based at least in part on the level of resource utilization of the processing resources satisfying a threshold.

15. The apparatus of claim 9, wherein the instructions are further executable by the processor to cause the apparatus to:
allocate, to a radio unit, a sub-envelope of the second processing envelope, the sub-envelope being for signal processing at the second network entity for communications at the radio unit, and the sub-envelope being based at least in part on channel conditions at the radio unit.

16. The apparatus of claim 9, wherein the first network entity comprises a higher layer, a virtual radio access network manager, or a host platform for a virtual radio access network entity, and the second network entity comprises a distributed unit or a baseband unit.

17. A method for wireless communication at a first network entity, comprising:
- receiving, from a second network entity, a first indication of a first processing envelope for signal processing at the first network entity, the signal processing associated with communicating with one or more user equipments (UEs);
- performing one or more measurements indicating channel conditions associated with communicating with the one or more UEs;
- transmitting, to the second network entity, a report including the one or more measurements indicating the channel conditions associated with communicating with the one or more UEs, wherein the one or more measurements comprise lower-bound measurements for receiver parameters, the lower-bound measurements for the receiver parameters comprise measurements of an equalizer frequency, a time decimation, or a combination thereof; and
- receiving, from the second network entity, a second indication of a second processing envelope for signal processing at the first network entity, the second indication of the second processing envelope being in response to transmitting the report.

18. The method of claim 17, wherein the one or more measurements comprise channel condition measurements associated with each UE of the one or more UEs, the channel condition measurements comprising measurements of a Doppler spread, a noise coherence bandwidth, or a combination thereof.

19. The method of claim 17, wherein the one or more measurements comprise inter-UE channel correlation measurements, the inter-UE channel correlation measurements comprising measurements of a covariance, a channel correlation, or a combination thereof.

20. A method for wireless communication at a first network entity, comprising:
- transmitting, to a second network entity, a first indication of a first processing envelope for signal processing at the second network entity, the signal processing associated with communicating with one or more user equipments (UEs);
- receiving, from the second network entity, a report including one or more measurements indicating channel conditions associated with communicating with the one or more UEs, wherein the one or more measurements comprise lower-bound measurements for receiver parameters, the lower-bound measurements for the receiver parameters comprise measurements of an equalizer frequency, a time decimation, or a combination thereof; and
- transmitting, to the second network entity, a second indication of a second processing envelope for signal processing at the second network entity, the second indication of the second processing envelope being in response to receiving the report.

21. The method of claim 20, wherein the one or more measurements comprise channel condition measurements associated with each UE of the one or more UEs, the channel condition measurements comprising measurements of a Doppler spread, a noise coherence bandwidth, or a combination thereof.

22. The method of claim 20, wherein the one or more measurements comprise inter-UE channel correlation measurements, the inter-UE channel correlation measurements comprising measurements of a covariance, a channel correlation, or a combination thereof.

* * * * *